United States Patent
Yudanov

(10) Patent No.: US 11,748,100 B2
(45) Date of Patent: Sep. 5, 2023

(54) PROCESSING IN MEMORY METHODS FOR CONVOLUTIONAL OPERATIONS

(71) Applicant: Micron Technology, Inc., Boise, ID (US)

(72) Inventor: Dmitri Yudanov, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 423 days.

(21) Appl. No.: 16/824,620

(22) Filed: Mar. 19, 2020

(65) Prior Publication Data

US 2021/0294608 A1 Sep. 23, 2021

(51) Int. Cl.
*G06F 9/30* (2018.01)
*G06N 3/08* (2023.01)

(52) U.S. Cl.
CPC ........ *G06F 9/30043* (2013.01); *G06F 9/3001* (2013.01); *G06N 3/08* (2013.01)

(58) Field of Classification Search
CPC .................................................. G06F 15/7821
See application file for complete search history.

(56) References Cited

U.S. PATENT DOCUMENTS

| | | |
|---|---|---|
| 2012/0041997 A1 | 2/2012 | Inaganti et al. |
| 2019/0065111 A1 | 2/2019 | Lea et al. |
| 2019/0079886 A1* | 3/2019 | Malladi ................. G06F 9/4806 |
| 2019/0138893 A1* | 5/2019 | Sharma ............ H01L 27/10802 |
| 2019/0294380 A1 | 9/2019 | Lea et al. |
| 2020/0013194 A1 | 1/2020 | Appu et al. |
| 2020/0034148 A1* | 1/2020 | Sumbul .................... G06N 3/04 |
| 2020/0035291 A1 | 1/2020 | Kasibhatla et al. |
| 2020/0168257 A1* | 5/2020 | Akerib ................ G06F 15/7821 |
| 2020/0349426 A1* | 11/2020 | Luo ......................... G06N 20/10 |
| 2021/0271597 A1* | 9/2021 | Verma ................. G06F 12/0207 |
| 2022/0114431 A1* | 4/2022 | Lee ....................... G06N 3/0454 |

OTHER PUBLICATIONS

International Search Report and Written Opinion, PCT/US2021/019236, dated Jun. 14, 2021.

* cited by examiner

*Primary Examiner* — Michael J Metzger

(74) *Attorney, Agent, or Firm* — Greenberg Traurig

(57) ABSTRACT

The present disclosure is directed to systems and methods for a Processing-In-Memory Device that is configured to perform dot product calculations. A sequence control may be used to store data in a memory array according to an allocation pattern. The cells of the memory array may correspond to array elements of the data. The sequence control may apply another array of data to groups of elements within the memory array using the allocation pattern to perform dot product calculations. The dot product calculations may be used, for example, to implement a layer in a convolutional neural network.

15 Claims, 8 Drawing Sheets

PROCESSING IN MEMORY METHODS FOR CONVOLUTIONAL OPERATIONS

BACKGROUND

Generic processors may interface with memory components and caches to perform repeated calculations on stored data. Data may be loaded into a cache, the processor may then access the data, the processor may calculate a result, and then the result may be stored in memory. Processors may perform repetitive or intensive linear algebra operations by handling matrix elements. For example, processors may perform read/write operations to fetch data, process it, and store it in memory. These generic processors may be used to implement convolutional operations.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Figure 1:
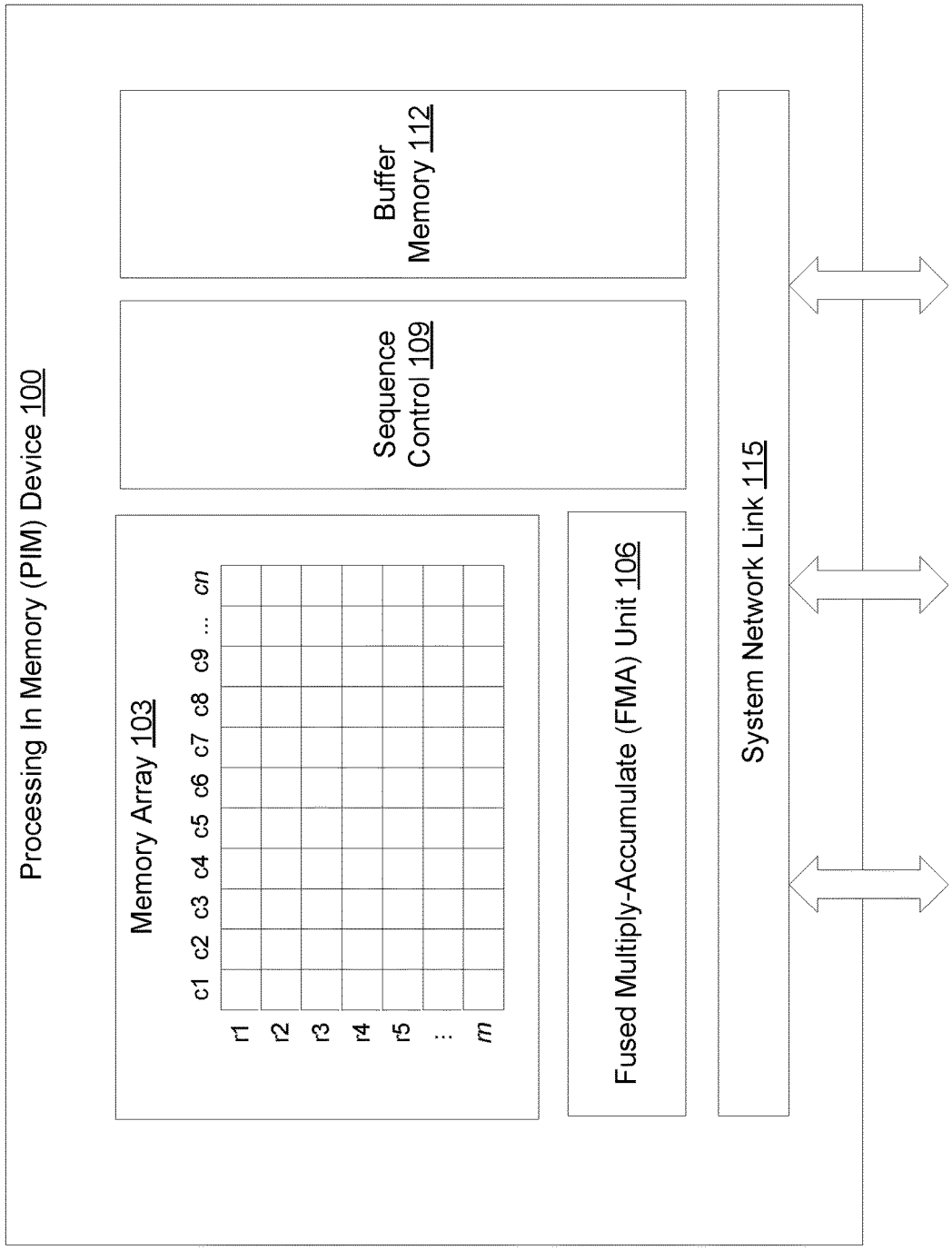
FIG. 1 is a drawing of a Processing In Memory (PIM) device according to various embodiments.

A Processing In Memory (PIM) device is a semiconductor device that comprises one or more memory arrays and a PIM processor coupled to these arrays in-memory. The PIM processor is configured to perform operations using data stored in the cells of the memory array without the need to perform time-intensive input/output operations, fetch operations, or load/store operations over a memory bus. In this respect, the PIM processor may access at least some data without a buffer memory or cache or bus to perform data and compute operations. In contrast, a host processor is coupled with one or more PIM devices over a memory bus or other link. A host processor may be a central processing unit (CPU), digital signal processor, graphics processing unit, special purpose processor, or general-purpose processor that is installed in a device or system external to the PIM device. The host processor may be installed in a computing device, lap top, mobile device, server, special purpose computer, general purpose computer.

Embodiments of the present disclosure are directed to a sequence control, which can be a part of PIM processor that is configured to store in a memory array of a PIM device with a first array of data by organizing the data of the first array into a plurality of groups. The groups are structured in the memory array according to an allocation pattern. The sequence control receives second array of data and converts at least some of the elements into a sequence for execution. The sequence control applies the sequence to sets of groups in the memory array according to the allocation pattern of the first array. The sequence is applied until there are no remaining groups in the memory array that should be addressed or until the end of sequence. A fused multiply-accumulate (FMA) unit of the PIM device is the main computational element of the PIM processor. It may be configured to generate a dot product array of data when the second array is applied to the groups. Thus, the sequence control may be configured to effectively tesselate or otherwise convolve an array of data across a memory array to generate a plurality of dot product calculations and their results.

In some embodiments, the data stored in the memory array is the data of a data object in which a feature is to be detected. For example, the data object may be an image. In addition, the second array applied to the memory array may be a filter designed to detect or identify a feature in the data object.

In some embodiments, the data stored in the memory array is filter data designed to detect or identify a feature. In addition, the second array applied to the memory array may be at least a portion of a data object that is applied to the filter in order to detect or identify a feature.

In some embodiments, the PIM device is a special purpose device used to implement a convolutional neural network. The PIM device may be used to implement one or more layers in a convolutional neural network. The convolutional neural network may be designed for detecting: image features in image data, motion features in video streams, text patterns in textual data, statistical features in multi-dimensional complex data, scientific features in scientific processes and simulations, astronomical features in astronomical data coming from the space, weather conditions in world weather data as well as predictions based on them, words in voice audio data. The convolutional neural network may be used to detect features or characteristics in computer generated graphics, virtual reality data, and augmented reality data. Features may be detected for satellite imagery, long exposure generated graphics, time-lapse videos, slow-motion videos. The convolutional neural network may be configured to perform feature detection on graphical or visual representation of data collected from a variety of sources such as data repositories or databases. The data subject to feature detection may be data that is structured, data that is semi-structured, data that is unstructured, data objects generated from machines, data logs, real-time data generated from a remote source, data that is aggregated from a plurality of sources, data received over a network, data that has been pre-processed by external systems, data that has been subject to visual filters, or data that generated at least partially by an external computing system. Features that searched for within the data include visual patterns, horizontal lines, edges, vertical lines, various shapes, curves, angles, particular colors, orientations. In addition, simple features may be combined to formulate more complex features such as complex objects.

FIG. 1 is a drawing of a Processing In Memory (PIM) device 100 according to various embodiments. A PIM device 100 is an integrated circuit. The PIM device 100 may be a semiconductor chip or die or a die stack. The PIM device 100 may include one or more memory arrays 103. A memory array 103 comprises a plurality of rows and columns and may be defined in terms of a row-column size. The example of FIG. 1 shows a memory array 103 having rows labeled r1-rn and columns c1-cn. At each row and column intersection is a memory cell configured to store an element of a data array. For example, a data array may be a single-dimension array containing four elements as follows: [A, B, C, D] where the first element is A, the second element is B, the third element is C, and the fourth element is D. The data array [A, B, C, D] may be stored in the memory array 103 such that each element of the data array is stored in a corresponding memory cell. For example, element A may be stored in cell (r1, c1), element B may be stored in cell (r1, c2), element C may be stored in cell (r1, c3), and element D may be stored in cell (r1, c4). Thus, in this example, the data array [A, B, C, D] is stored along the first row and occupies the first four columns. As another example, the data array [A, B, C, D] may be stored along the first column occupying the first four rows. Here, element A may be stored in cell (r1, c1), element B may be stored in cell (r2, c1), element C may be stored in cell (r3, c1), and element D may be stored in cell (r4, c1). Thus, the memory array 103 is a hardware component used to store data as a plurality of array elements addressable by rows and columns. Although only one memory array 103 is depicted in the PIM device 100 of FIG. 1, the PIM device 100 may include several memory arrays 103 organized throughout the PIM device 100. Some embodiments are directed to parallel processing using multiple arrays 103.

A data array element can be a binary bit (the bits that can have two values, e.g. "0" or "1" encoded as low or high value of a memory cell), a multi-state bit (e.g., the bits that can have multiple values, e.g. QCL NAND Flash memory can have sixteen values encoded as Vt (threshold voltage) of a floating gate transistor), or a piece of information that may have infinite range (e.g. information encoded as analog charge on a DRAM capacitor or analog resistance in a ReRAM memory cell). For example, if a data array element is a binary bit then the data array [A, B, C, D] may be stored in the memory array 103 such that each element of the data array is stored in a corresponding memory cell as low or high value of a memory cell. For example, if a memory cell is a capacitor than low would may correspond to a capacitor having no charge (or having negative charge), and high value may correspond to a capacitor having positive charge (or having no charge). Similarly, if a data array element is a multi-state bit then the data array element may be stored in a plurality of memory cells. For example, if a memory cell is configured to store two bits and the data array element is four bits, then two memory cells are needed to store a single data array element. To illustrate, the number "9" in decimal may be expressed as the four-bit binary number "1001". The left part of the four-bit binary number (two most significant bits) may be stored in one multi-state cell as the binary number "10" while the right part (two least significant bits) may be stored in another multi-state cell as the binary number "01". A data array element may refer to a piece of information having an infinite range such as, for example, some rational fractions, an irrational number, or other floating-point numbers etc. Such data array elements may be truncated or rounded and stored as a finite number of bits. Alternatively, infinite range can be represented by analog value such as analog resistance or capacitance that can store information which can be read in a form of analog current or voltage. In this respect, elements can form element-groups representing wider piece of information. For example, several binary bits may form an element-group representing an integer or a floating-point number. The meaning of data array elements and element-groups may be interchanged depending on the context.

The memory array 103 may be implemented using various types of technologies, organizations or aspects. The memory array may be defined as including both volatile and nonvolatile memory. Volatile components may be those that do not retain data values upon loss of power. Nonvolatile components may be those that retain data upon a loss of power. The memory array 103 may comprise random access memory (RAM), read-only memory (ROM), solid-state memory arrays. RAM may comprise static random-access memory (SRAM), dynamic random access memory (DRAM). The memory array 103 may comprise solid-state memory such as Flash memory, NOR Flash (e.g., Flash memory in a NOR configuration) or NAND Flash (e.g., Flash memory in a NAND configuration). The memory array may be resistive RAM (ReRAM), cross-point memory, or cross-bar 3D memory. Each type of memory technology used to implement the memory array may be accessed using a row, column, or other memory address. Rows may be referred to as word lines. A word line may comprise terminals of transistor gates of corresponding memory cells. Alternatively, a word line can be connected directly to memory cell matter, e.g. for resistor-like or for diode-like memory cells. Columns may be referred to as bit lines. A bit line may comprise source and/or drains of transistors that constitute memory cells, capacitor terminals of the capacitors that constitute memory cells, resistor terminals of the resistors that constitute memory cells or diode terminals of the diodes that constitute memory cells or a combination of thereof.

Memory array 103 comprises peripheral circuitry, which can be outside of it or a part of it. The peripheral circuitry includes a Fused Multiply-Accumulate (FMA) Unit 106, a sequence control 109, a buffer memory 112, a system link 115, and potentially other integrated components. The FMA unit 106 is a part of a PIM processor. The FMA unit 106 may include sense amplifiers to sense data from memory array 103 and drivers to store data back to memory array 103. The FMA unit 106 may be configured to perform dot product multiplication on data. The data may be supplied directly from the memory array 103 as well as from a sequence control 109. In some embodiments, the FMA unit 106 may be dedicated to only perform dot product matrix calculations. The FMA unit 106 may be configured to store the dot product output as output array data. The FMA unit 106 may be configured to perform a multiply-accumulate operation that computes a product of the inputs and adds that product to an accumulator. In this respect, the FMA unit 106 may perform dot product calculations on two input matrices.

The sequence control 109 is a part of a PIM processor. The sequence control 109 may comprise integrated circuitry dedicated to store data into the memory array 103 by organizing the data into a plurality of groups. For example, a set of groups may be organized along a single column or a set of groups may be organized along a single row.

In addition, the sequence control 109 may receive, derive or generate a second array of data and apply the second array of data to the groups according to an allocation pattern. In this respect, a second array of data plays a role of a micro-code that directs opening and closing rows and columns of memory array 103 to fetch the data in and out and the FMA unit 106 performs computations on data from memory array 103. The sequence control 109 may effectively tesselate or convolve the second array of data across the memory array 103 based on the allocation pattern. For example, the sequence control 109 may apply second array of data in several iterations to different portions of the memory array 103 following a certain allocation pattern that reflects how data is stored in memory array 103.

The PIM device 100 may also include buffer memory 112. The buffer memory may be included as part of the sequence control 109 and/or a part of FMA unit 106 or it may be external to the sequence control 109 and/or an FMA unit 106 or it may be connected to 109 and 106 via internal bus, which may be a part of a system link 115. Alternatively, the buffer memory 112 can be a part of memory array 103 allocated specifically for buffer purposes described herein. Specifically, a part of memory array 103 allocated for buffer memory may be a part of array with faster access (e.g., having shorter path to FMA unit 106). The buffer memory 109 may comprise buffers to temporarily store data as the sequence controller 109 and FMA unit 106 perform operations. The sequence control 109 and/or FMA unit 106 may write to or read from the buffer memory 112. For example, the buffer memory 112 may be used to store second data or intermediate result while the memory array 103 and/or FMA unit 106 may be used to process first data. The sequence control 109 and/or FMA unit 106 may generate a second array based on the second data. For example, the sequence control 109 and/or FMA unit 106 may generate a second array made of elements derived from the first or second data. The second array may be applied to groups of cells of the memory array 103 according to an allocation pattern.

The PIM device 100 may also include a system link 115. The system link may provide data and/or control signals between the PIM device 100 and external systems. The system link 115 may couple to various components of the PIM device 100 such as, for example, the memory array 103, the FMA unit 106, the sequence control 109, the buffer memory 112, and other components. Thus, system link 115 may include and internal link amongst various components of PIM device 100 that allow these components to exchange data and/or control signals among each other. The system link 115 may comprise input/output ports to couple to external systems outside the PIM device 100. The system link 115 may be an Input/Output (10) bus such as, for example, a DDR4 bus or PCIe bus. In this respect, an external system may read or write data to the memory array 103, the FMA unit 106, and buffer memory 112. In addition, external systems may transmit control signals to the sequence control 109 to program or otherwise control the sequence control 109.

An external system may include a host processor with a PCB motherboard, wherein the PIM device 100 is connected to host processor over a bus such as DDR4, DDR5 or PCIe or alike. The external system may execute an operating system, applications, libraries, scripts, or programming languages. The external system may include one or more server racks or computers or other arrangements. A server may be a single installation or may be distributed among many different geographical locations. The external system may include a plurality of computing devices that together may comprise a hosted computing resource, a grid computing resource and/or any other distributed computing arrangement. In some cases, the external system may correspond to an elastic computing resource where the allotted capacity of processing, network, storage, or other computing-related resources may vary over time. The external system may implement one or more virtual machines that use the resources of the computing system 110. Various software components may be executed on one or more virtual machines. The external system may also include additional PIM devices 100. In this respect, an instance of a PIM device 100 may query, control or access data in any additional PIM device 100 installed in a system.

The system link 115 may allow the PIM device 100 to couple to external systems that together combined or separately implement a convolutional neural network. For example, the PIM device 100 may implement a layer within a neural network or multiple layers within a neural network. For example, the PIM device 100 may be used to implement a convolution layer. The system link 115 may extract outputs of a PIM device 100 and input them into different layers of the neural network located in other PIM devices or other parts of external system. A pooling layer in a neural network may obtain outputs from the system link 115 of a PIM device 100, may perform pooling operations, and may pass the result as inputs into the PIM device 100. For example, the output data generated by the FMA unit 106 may be accessed by the system link 115 and processed externally by a pooling layer, where those results are supplied to the memory array 103 of the PIM device 100 via the system link 115 for additional processing.

While FIG. 1 provides explanation of the overall architecture, FIGS. 2 and 3, discussed below, provide more specific examples of how data is processed in a PIM device 100 according to various embodiments.

Figure 2:
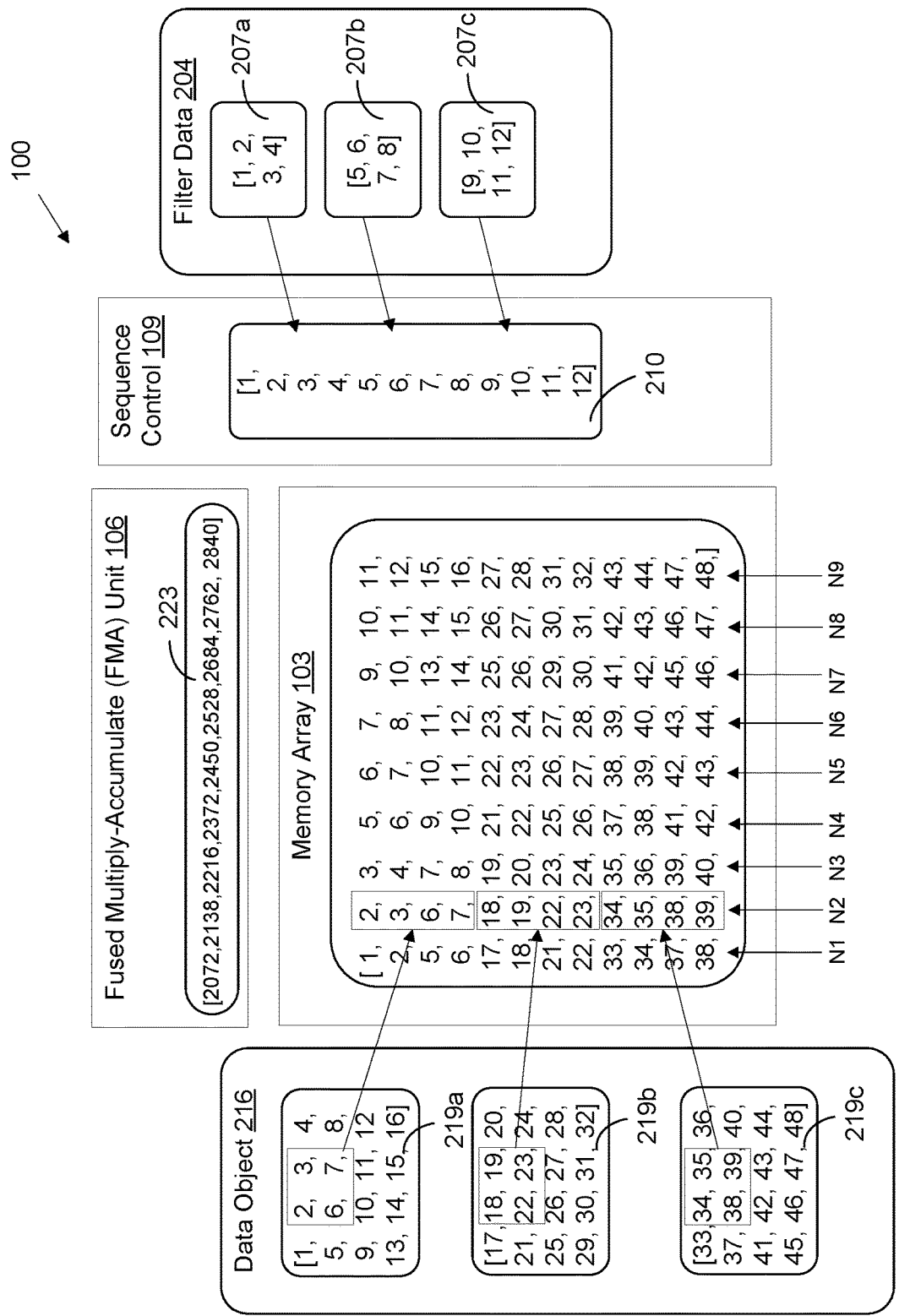
FIG. 2 is a drawing of a PIM device configured to apply filter data to a memory array using an allocation pattern according to various embodiments.

FIG. 2 is a drawing of a PIM device 100 configured to apply filter data 204 to a memory array 103 using an allocation pattern according to various embodiments. FIG. 2 provides an example of a PIM device 100 that receives filter data 204, which may be stored in buffer memory 112. Filter data 204 may comprise the elements of one or more filters 207a-c. A filter 207a-c may be predetermined by a system or a user. A filter 207a-c may be a convolutional filter. A filter 207a-c may be formatted as a matrix of elements where the element values are selected for purposes of searching for or identifying a feature. In the context of image recognition in a convolutional neural network, a filter 207a-c may contain elements designed to detect a feature such as, for example, an edge, a horizontal line, a vertical line, etc. As shown in the example of FIG. 2, the filter data 204 includes a first filter 207a, a second filter 207b, and a third filter 207c. The filter data 204 may be transferred into the PIM device 100 via a system link 115.

Further, in the example of FIG. 2, the sequence control 109 is configured to generate a filter array 210 from the filter data 204. For example, the filter array 210 may include one or more elements from filters 207a-c that comprise the filter data 204. In this example, the filter array 210 comprises a one-dimensional array derived from elements taken from several two-dimensional arrays. For example, the upper left element [1] of the first filter 207a is the first element in the filter array 210. The upper right element [2] of the first filter 207a is the second element in the filter array 210. The lower left element [3] of the first filter 207a is the third element in the filter array 210. The lower right element [4] of the first filter 207a is the fourth element in the filter array 210. Then, the same pattern may be applied to the second filter 207b, and then again to the third filter 207c. Thus, in some embodiments, the elements of multiple filters 207a-c may be merged into a single filter array 210 by the sequence control 109. Alternatively, the filter data may be delivered to sequence control 109 in this merged format.

The PIM device 100 may also store a data object 216 into the memory array 103. A data object 216 may be an image, a portion of an image, several portions taken from several images, audio data, non-audio/visual data, or any other data object that is subject to feature identification.

The data object 216 may be represented as one or more arrays that express the information of the data object 216. The example of FIG. 2 shows the data object 216 comprising three 4×4 arrays. The data object 216 may be organized according to a format. If the data object 216 represents image data, one example of a data format is Red-Blue-Green (RGB), where the image is described with respect to a red channel, green channel, and blue channel. In some embodiments, different arrays are used to represent different channels for a particular format. For example, if the data is in an RGB format, a first array may contain data for a red channel, a second array may contain data for a green channel, and a third array may contain data for a blue channel. The data object 216 may be formatted in different formats other than RGB.

The data object 216 may be organized into one or more data object arrays 219a-c. A data object array 219a-c may be an array constituting a portion of the data object 216. The sequence control 109 and FMA unit 106 may be configured to store data in the memory array 103 according to the data object arrays 219a-c. In addition, the sequence control 109 and FMA unit 106 may convert the relevant elements of a data object array 219a-c into a group such as, for example, a one-dimensional array. In this example, the data object array 219a may be stored into a part of the upper third of the memory cells, the second data object array 219b, may be stored into a part of the middle third of the memory cells, and the third data object array 219c may be stored into a part of the lower third of the memory cells.

FIG. 2 shows a plurality of groups labeled N1, N2, N3, . . . N9. In some embodiments a group is organized as a single column-group in the memory array 103. A first group N1 is composed of the array [1, 2, 5, 6, 17, 18, 21, 22, 33, 34, 37, 39]. A second group N2 is composed of the array [2, 3, 6, 7, 18, 19, 22, 23, 34, 35, 38, 39]. Groups N3-N9 are also formed in a similar manner by sliding a single column frame to the next column. Thus, the allocation pattern used in the example of FIG. 2 is based on a single column frame that stores the data object 216 in a plurality of groups N1-N9 in adjacent columns. Thus, the data object 216 is stored in the memory array 103 according to an allocation pattern in a manner that allows each group specified by the allocation pattern to be computed in an efficient manner by the FMA unit.

As shown in the example of FIG. 2, the sequence control 109 and FMA unit 106 may apply the filter array 210 to a set of memory array column-groups N1-N9 stored in the memory array 103 according to an allocation pattern. As shown in FIG. 2, the filter array 210 is applied to all column-groups N1-N9 of the memory array 103, where each column-group includes at least some elements of each data object array 219a-c stored according to an allocation pattern. The FMA unit 106 may perform a dot product calculation for all column-groups N1-N9 concurrently based on the filter array 210. For example, the FMA unit 106 may perform a dot product calculation for column-group N1 and the filter array 210. Here, the group N1 is composed of is the array [1, 2, 5, 6, 17, 18, 21, 22, 33, 34, 37, 39], the filter array 210 is composed of the array [1, 2, 3, 4, 5, 6, 7, 8, 9, 10, 11, 12] and the dot product of the two is performed as follows: 1×1+2×2+5×3+6×4+17×5+18×6+21×7+22×8+33×9+34× 10+37×11+39×12=2060. Concurrently with the group N1, the FMA unit 106 may perform a dot product calculation on the next group, group N2 [2, 3, 6, 7, 18, 19, 22, 23, 34, 35, 38, 39] and the filter array 2072 [1, 2, 3, 4, 5, 6, 7, 8, 9, 10, 11, 12] as follows: 2×1+3×2+6×3+7×4 18×5+19×6+22×7+ 23×8+34×9+35×10+38×11+39×12=2138. Each computing unit of the FMA unit may perform a dot product computation for a relevant column concurrently with all other computing units. Thus, all dot products in memory array may be computed in parallel with each other.

Column-group N1, column-group N2 as well as the remaining column-groups N3-N9 are each applied as inputs to a dot product calculation with the filter array 210 to produce dot product calculations for each column-group. The sequence control 109 and FMA unit 106 may apply the filter array 210 to all column-groups concurrently in a series of iterations. Specifically, the sequence control 109 sequences through the filter array 210 by applying each number as a common operand to the FMA unit 106. Each group of sense amplifiers of FMA unit 106 may load a number from relevant column-group and perform multiplication and accumulation to buffer memory 112. In a first iteration the sequence control 109 applies the first multiplier from the filter array 210 (e.g. the number "1") to the first multiplicands of all groups N1-N9 or to a subset of groups of N1-N9 to produce partial results. As part of this first iteration, for group N1, the calculation is 1×1=2, for group N2, the calculation is 1×2=1, for group N3, the calculation is 1×3=3 and so on.

In the second iteration, the sequence control 109 applies the second multiplier from the filter array 210 (e.g., the number "2") to the second multiplicands of all groups N1-N9 or a subset of groups of N1-N9 to produce partial results. As part of this second iteration, for group N1 2×2=4, for group N2, the calculation is 2×3=6, for group N3, the calculation is 2×4=8 and so on.

In addition, in the second iteration, the sequence control 109 accumulates these partials results to the results from the previous iteration to produce current total results. For example, for group N1, the accumulation operation is 1+4=5, for group N2, the accumulation operation is 2+6=8, and for group N3, the accumulation operation is 3+8=11. The sequence control 109 continues to iterate through multipliers of filter array 210 and apply them to groups N1-N9 to produce multiplication results and accumulate them to current total results until the end of filter array 210. The results of each calculation are stored as a dot product array of data 223. For example, for group N1, the final accumulated dot product result is 2072, for group N2, the final accumulated dot product result is 2138 and so on. Thus, the sequence control 109 is able to produce dot product array of data 223 for all groups N1-N9 or for a subset of thereof concurrently by iterating through multipliers stored in filter array 210, converting them to common control signal, applying this signal to read relevant multiplicands from the memory array 103 into the FMA unit 106 and applying this control signal to the FMA unit 106 to produce fused multiply-accumulate operation and to update the current total result, which at the end of all iterations constitutes the dot product array of data 223. Multiple dot product arrays of data 223 can be subsequently produced and stored in the buffer memory 112 or in a memory array 103 at another set of rows or in another memory array.

FIG. 2 shows a dot product array of data 223 with elements corresponding to each individual dot product calculation. Elements of the dot product array of data 223 constitute a feature map, which provides information on where (or in which part of) in data object 216 the feature was detected. The highest value in the feature map corresponds to highest probability of feature presence, and the lowest value in the feature map corresponds to lowest probability of feature presence. The feature map may be passed onto additional layers in a neural network or may be used in classification to identify a feature.

In some embodiments, the allocation pattern applied to a portion of the object data 216 using a bit-serial allocation pattern. For example, each element, such as a single number formed by bits, from a set of groups may be structured along the same column of the memory array 103. In other embodiments, the allocation pattern may be applied to the to a portion of the data object 216 using a bit-parallel allocation pattern. For example, each element, such as a single number formed by bits, from a set of groups may be structured along the rows of the memory array column-wise. In other embodiments, the allocation pattern may be applied to the to a portion of the data object 216 using a serial-parallel allocation pattern. Examples of allocations patterns are discussed in more detail with reference to FIGS. 4-6.

The system link 115 may be used to access the dot product array data 223 and/or derivatives of the dot product array data for subsequent processing. The dot product array data 223 of the sum of its elements may express at least partly, the information of whether a feature is present in the data object 216.

The memory array 103 may be stored with additional data object data which is organized into a plurality of groups within the memory array. The additional object data may be a different image or different image data than the object data 216. The FMA unit may be configured to generate additional dot product array of data by applying the filter array 210 to the plurality of groups of the additional array. In this respect, the filter array 210 may be reused for multiple data objects as new data objects are stored into the array. In addition, a different filter array may be applied to the contents of the memory array 103. In addition, same filter array may be applied to different memory arrays with different data objects stored in them.

In some embodiments, the PIM device 100 comprises a plurality of memory arrays 103. Each memory array 103 may store the same data object at the same time. Different filter arrays may be applied to each memory array 103 to effect concurrent processing of a data object with respect to different filter data.

Figure 3:
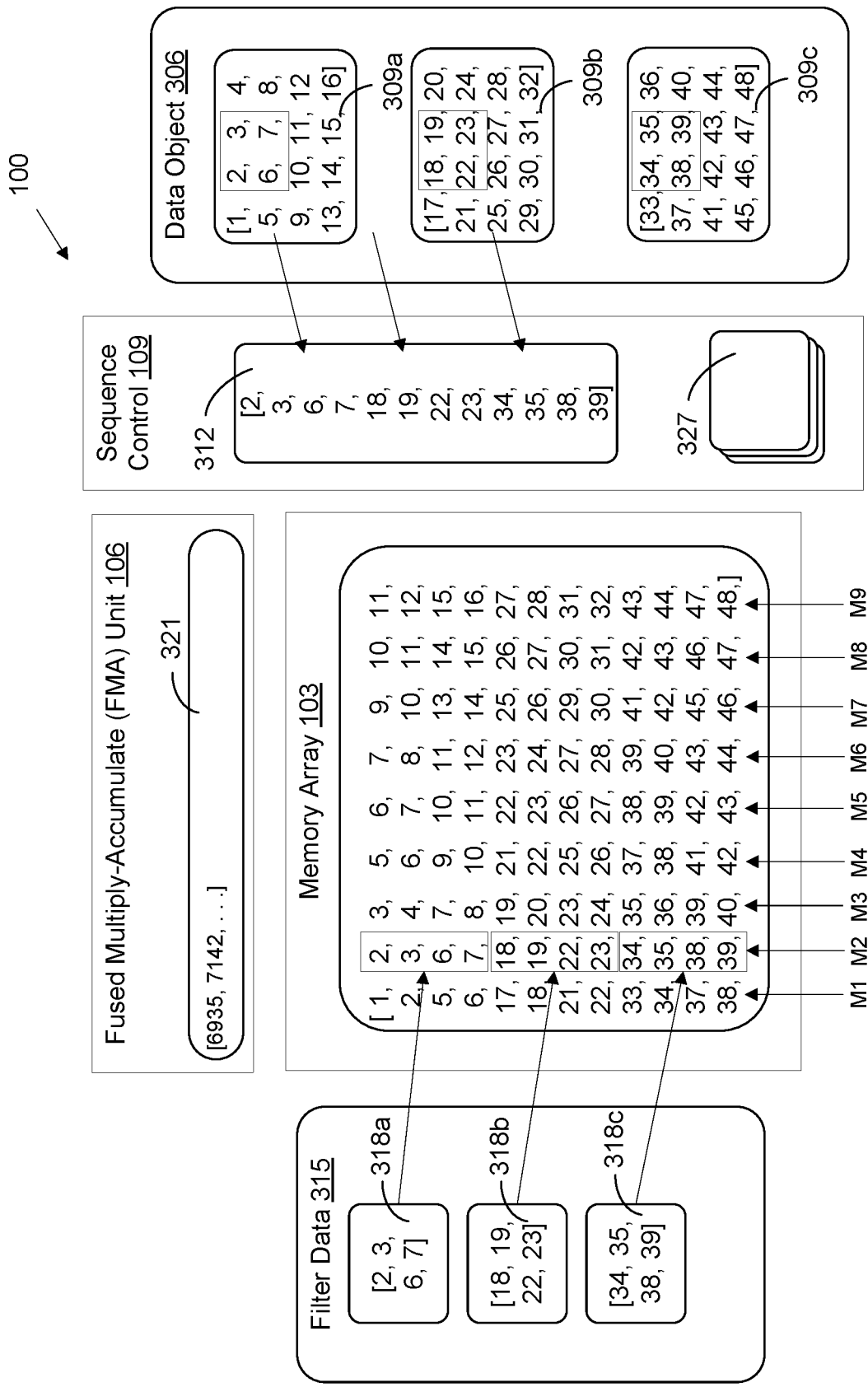
FIG. 3 is a drawing of a PIM device 100 configured to apply a data object array to a memory array 103 using an allocation pattern according to various embodiments.

FIG. 3 is a drawing of a PIM device 100 configured to apply a data object array to a memory array 103 using an allocation pattern according to various embodiments. While FIG. 2 depicts an example of applying a filter array to a data object 216 fixed in a memory array 103, FIG. 3, applies a data object 306 to filter data 315 fixed in a memory array. The data 306 object is applied by the sequence control 109 to the cells of the memory array 103 according to an allocation pattern. The object data 306 may be organized in a plurality of data object arrays 309a-c. A data object 306 be represented as various data object arrays 309a-c. The sequence control 109 may be configured to generate a data object array 312 based on the data elements from one or more data object arrays 309a-c of the data object 306. The data object 306 may be subject to feature identification using a plurality of filters.

The memory array 103 may store filter data 315 according to an allocation pattern. The filter data may comprise several filter arrays 318a-c. A filter array 318a-c may be a convolutional filter. For example, the filter data 315 may be convolutional filter data that includes a plurality of multi-dimensional convolutional filters such as, for example, filter arrays 318a-c.

In some embodiments, the allocation pattern may be a bit-serial allocation pattern, where elements of groups of filters 318a-c are structured along a column of the memory array 103 for a bit-serial pattern. In other embodiments, the allocation pattern is a bit-parallel allocation pattern, where elements of groups of filters 318a-c are structured along the rows of the memory array 103 for a bit-parallel pattern.

The filter data 315 is stored in the memory array 103 according to an allocation pattern. For example, multiple filter arrays may be organized in column groups M1-M9. For example, a first filter array 318a, a second filter array 318b, and a third filter array 318c may be converted into a single dimension array constituting the column group M2. Additional filter arrays of the filter data 315 may similarly be organized in other groups such as groups M1 and M3-M9.

The sequence control 109 may be configured to apply the data object array 312 to the groups M1-M9 stored in the memory array 103 according to an allocation pattern. For example, the data object array 312 is applied to a first group M1 to generate a dot product calculation as follows: group M1 composed of the array [1, 2, 5, 6, 17, 18, 21, 22, 33, 34, 37, 39] is multiplied by the data array 312 [2, 3, 6, 7, 18, 19, 22, 23, 34, 35, 38, 39] to generate dot product result 6935. Concurrently with group M1, the group M2 composed of the array [2, 3, 6, 7, 18, 19, 22, 23, 34, 35, 38, 39] is multiplied by the data array 312 to yield the dot product calculation 7142. In the first iteration, the sequence control 109 applies the first multiplier from the data array 312 (e.g., the number "2") to the first multiplicands of all groups M1-M9 or a subset of groups of M1-M9 to produce partial results. As part of this first iteration, for group M1, the calculation is 2×1=2, for group M2, the calculation is 2×2=4, for group M3, the calculation is 2×3=6 and so on. In the second iteration, the sequence control 109 applies the second multiplier from the data array 312 (e.g., the number "3") to the second multiplicands of all groups M1-M9 or a subset of groups of M1-M9 to produce partial results. In the second iteration, for group M1, the calculation is 3×2=6, for group M2, the calculation is 3×3=9, for group M3, the calculation is 3×4=12 and so on.

In addition, in the second iteration, the sequence control 109 accumulates these partials results to the results from the previous iteration to produce current total results. For example, for group M1, the operation is 2+3=5, for group M2, the operation is 4+9=13, for group M3, the operation is 6+12=18. The sequence control 109 continues to iterate through multipliers of data array 312 and apply them to groups M1-M9 to produce multiplication results and accumulate them to current total results until the end of data array 312. The results of each calculation are stored as a dot product array of data 321. For example, for group M1, the final accumulated dot product result is 6935, for group M2 the final accumulated dot product result is 7142 and so on. Thus, the sequence control 109 is able to produce dot product array of data 321 for all groups M1-M9 or for a subset of thereof concurrently by iterating through multipliers stored in data array 312, converting them to common control signal, applying this signal to read relevant multiplicands from the memory array 103 into the FMA unit 106 and applying this control signal to the FMA unit 106 to produce fused multiply-accumulate operation and to update the current total result, which at the end of all iterations constitutes the dot product array of data 321. Multiple dot product arrays of data 321 can be subsequently produced and stored in the buffer memory 112 or in a memory array 103 at another set of rows or in another memory array.

Thus, the FMA unit 106 is configured to generate dot product array data 321 in response to applying the data object array 312 to groups within the memory array 103 according to the allocation pattern. Additional data object arrays 327 may include different elements of the data object 306 so that the data object 306 is represented as a plurality of data object arrays 312, 327. Each of the additional data object arrays 327 may be applied to the groups M1-M9 to generate another dot product array data 321.

The values of the dot product array data 321 may be accumulated to generate data that may be a part of a feature map used to identify features described by filter data 315, and that may be contained in object data 306. For example, each of the additional data object arrays 327 may be applied to a particular group M1-M9 to generate corresponding dot product calculations.

In addition, the memory array 103 may be configured to store an additional set of filter arrays comprising a plurality of groups within the memory array 103. Here, additional filter data containing new filter arrays may be stored into the memory cells of the memory array 103. The FMA unit 106 may be configured to generate an additional dot product arrays of data by applying the data object 306 to the additional filter data.

In some embodiments, the PIM device 100 comprises a plurality of memory arrays 103. Each memory array 103 may store the same filter data 315. Different data objects may be applied to each memory array 103 to effect concurrent processing of multiple data objects with respect to the same filter data. Each data object may represent an image of portions of a video stream. Consecutive images or video streams may be pipelined or batched using multiple memory arrays 103.

Figure 4:
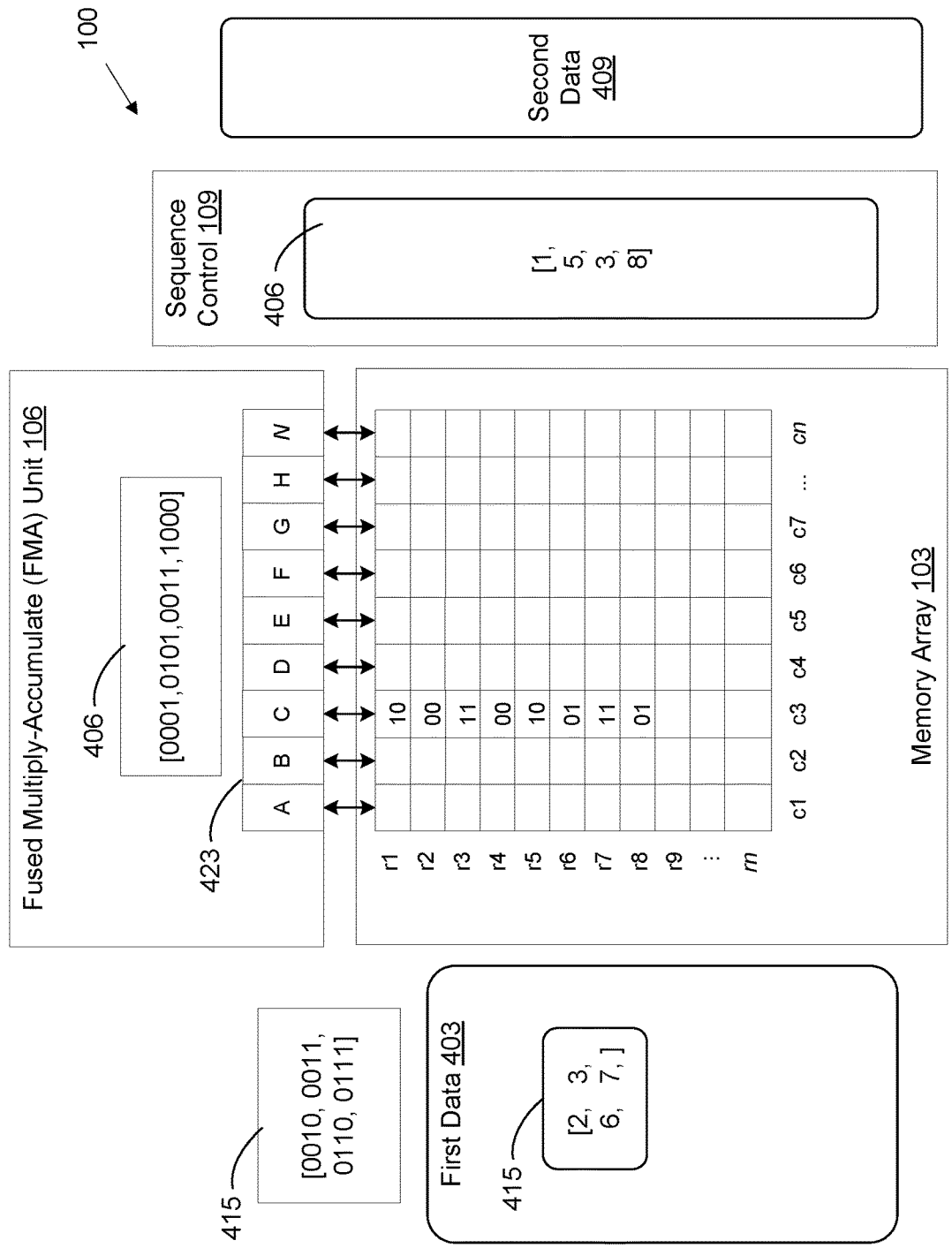
FIG. 4 is a drawing of an example of a bit-serial allocation pattern for organizing data in a memory array of a PIM device.

FIG. 4 is a drawing of an example of a bit-serial allocation pattern for organizing data in a memory array of a PIM device 100. The memory array 103 of FIG. 4 comprises memory cells addressable by row (r1-rn) and column (c1-cn). In addition, each cell is depicted as a multi-state cell that is configured to store two bits of data ("00", "01", "10", or "11"). Although multi-state cells are shown in the example of FIG. 4, the discussion of FIG. 4 is applicable to single bit cells, other multi-state cells, or any other type of cell configured to store data, including cells that can store data in analog form with wide dynamic range and precision.

The PIM device 100 is configured to store first data 403 in the memory array 103 according to a bit serial allocation pattern. Second data 409 is used to generate second array of 406 which includes elements from second data 412. Here, the second array of data 406 is composed of the array [1, 5, 3, 8] in decimal format. The second array of data 406 is also expressed in a binary format as follows [0001, 0101, 0011, 1000]. Each element of the second array of data 406 is provided as an input to the FMA unit 106 in a form of control signal where it serves as a multiplier to perform a series of iterations on multiplicands stored in the memory array 103. The first data 403 includes a first group 415 composed of the array [2, 3, 6, 7] in decimal format. The first group 415 may be expressed in binary as follows: [0010, 0011, 0110, 0111]. The first group 415 may be referred to as a first array of data elements.

In one embodiment, the first data 403 is a data object while the second data includes one or more filters to be applied to the data object. Here, the second array of data 406 may be an array for a convolutional filter. In another embodiment, the first data 403 includes filter data of one or more convolutional filters while the second data 409 includes a data object. Here the second array of data comprises elements of the data object.

The sequence control 109 performs iterations of multiplications and accumulations by applying each element from the second array of data 406 to the groups stored in the memory array 103. The sequence control may be implemented as a controller programmed by microcode that performs a series of dot product multiplications and accumulations on one or more multiplicands simultaneously by applying each multiplier. Each multiplier (e.g., an element of a second array of data 406) is provided via a control signal to FMA array, or via a system link 115 or a memory buffer 112 of the PIM device 100. In some embodiments, the second array of data 406 may be stored in the memory array 103 by the sequence control 109.

When applying a bit-serial allocation pattern, the sequence control 109 converts the first data 403 into a plurality of groups where each group is an array of elements that constitute the first data 403, such as, for example a first group 415. In this respect, each group may be formed to constitute sets of elements that together, represent the first data 403. Each group is stored bit-by-bit along a bit line. For example, the first group 415 is composed of the array [2, 3, 6, 7] in decimal format and is stored along the first bit line. For example, the bit line referenced as column c3 is the only bit line that stores the first group 415. Moreover, because each element of the first group 415 is larger than the capacity of a cell, each data array element occupies multiple cells along the same bit line. For example, the first element of the first group 415 is the number "2" (in decimal) or "0011" (in binary). This element is stored in cells (r1, c3) and (r2, c3), beginning with the two least significant bits. This pattern continues such that the first group 415 is stored along column c3 between rows r1 and r8.

A second group may be stored along the same bit line as the first group 415 or possibly along other bit lines. Subsequent groups are stored in a similar manner until the first data 403 is completely stored in the memory array 103. If memory array 103 is not sufficient to store data 403 than it could be stored in another memory array or another part of it could be stored in memory array 103 after the computations are done on the first part. As a result, the first data 403 is stored in the memory comprising sets of groups that are structured according to a bit-serial allocation pattern where each set of groups is stored along a respective bit line.

Using this allocation pattern, the sequence control 109 is configured to apply the second array of data 406 to each of the plurality of sets of groups. For example, the sequence control 109 may activate all or a subset of all of bit lines or columns of the memory array 103 concurrently so that the one or more elements (e.g. bits) within each set of groups stored on relevant bit line are provided as inputs into the relevant computing units within FMA unit 106 along with the second array of data 406 provided by sequence control 109. For example, the sequence control 109 may open or otherwise activate the first row to select the first elements or first sets of elements from the groups within the first row. This includes the bits stored across several groups in columns c1-cn at the selected row. These bits are provided as inputs into relevant computing units of the FMA unit 106.

The FMA unit 106 is controlled by the sequence control 109 to perform a plurality of concurrent dot product multiplications based on data from activated columns stored at the activated row at each iteration. The FMA unit 106 may be configured as a plurality of sub-FMA units 423. For example, each sub-FMA unit 426 may be dedicated to separate bit lines or columns. Here, a first sub-FMA unit 426 (unit A) performs dot product multiplications where the multiplicand is received from the first column c1, a second sub-FMA unit 426 (unit B) performs dot product multiplications where the multiplicand is received from the second column c2, a third sub-FMA unit 426 (unit C) performs dot product multiplications where the multiplicand is received from the third column c3, and so on. Microcode may be used to configure and reconfigure the FMA unit 106 so that the number of input columns to a particular sub-FMA unit 426 is variable. A sub-FMA unit 426 may receive a multiplicand from a plurality of columns, for example. However, the example of FIG. 4 uses a bit-serial allocation pattern where each sub-FMA unit 426 is dedicated to a single column.

In a first iteration, the concurrent dot product multiplications include multiplying the elements of each column along rows r1 and r2 with the multiplier "0001", which is the first number of the second array of data 406 which is [0001, 0101,0011,1000]. The first sub-FMA unit 423 (unit A) multiplies the number "0001" in binary with the bits stored in the cells (r2, c1) and (r1, c1), the second sub-FMA unit 423 (unit B) multiplies the number "0001" with the bits stored in the cells (r2, c2) and (r1, c2), the third sub-FMA unit 423 (unit C) multiplies the number "0001" with the bits stored in the cells (r2, c3) and (r1, c3), which is "0010" in binary, and so on. Thus, the first iteration involves several dot product calculations performed by sub-FMA units 426 in parallel for one or more activated rows. For a given iteration, multiple rows may be activated in a particular order to multiply the contents of a plurality of cells that store a single data array element. This multiplication may involve carry operations that generate intermediate values that may be stored in a buffer memory 112.

In the second iteration, the concurrent dot product multiplications include multiplying the elements of each column along rows r3 and r4 with "0101" in binary, which is based on the second number of the second array of data 406 [0001,0101,0011,1000]. Here, the first sub-FMA unit 423 (unit A) multiplies the number "0101" with the bits stored in the cells (r4, c1) and (r3, c1), the second sub-FMA unit 423 (unit B) multiplies the number "0101" with the bits stored at the cells (r4, c2) and (r3, c2), the third sub-FMA unit 423 (unit C) multiplies the number "0101" with the bits stored in cells (r4, c3) and (r3, c3), which is "0011" in binary, and so on. After or during the dot product multiplications of second iteration, each sub-FMA unit 423 may accumulate the dot product multiplication results of the previous iteration(s). The FMA unit 106 may use the buffer memory 112 to store the dot product multiplication results of the previous iterations or any numbers being carried as a result of arithmetic operations. Each sub-FMA unit 423 may perform a multiply-accumulate operation at a given iteration. For example, in a first iteration, the third sub-FMA unit (unit C) multiplies "0001" in binary with the number stored across the cells (r2, c3) and (r1, c3), which is the binary number "0010" to generate a first result. At the second iteration, the third sub-FMA unit 423 (unit C) multiplies the binary number "0101" with the number stored across the cells (r4, c3) and (r3, c3), which is the binary number "0011" to generate a second result. The first result and second result are summed together or otherwise accumulated to generate an accumulated result. This process repeats for each iteration until the dot product multiplication for each group such as the first group 415 is complete. Although decimal numbers are shown by way of example, various embodiments may use floating point numbers, numbers expressed with more multiple bits (e.g., more or less than 4-bit numbers, as shown in the example of the figures), or analog values of memory cells (e.g., analog voltages and currents) to produce relevant results (e.g., a floating point number generated from floating point calculations, an analog number based on current or voltage summations which can be converted to digital format or maintained in analog format and stored in respective memory cells).

Elements of the computed dot product array may constitute a feature map, which provides information on where (or in which part of) in the data object the feature was detected. The highest value in the feature map corresponds to highest probability of feature presence, and the lowest value in the feature map corresponds to lowest probability of feature presence. The feature map may be passed onto additional layers in a neural network or may be used in classification to identify a feature.

Figure 5:
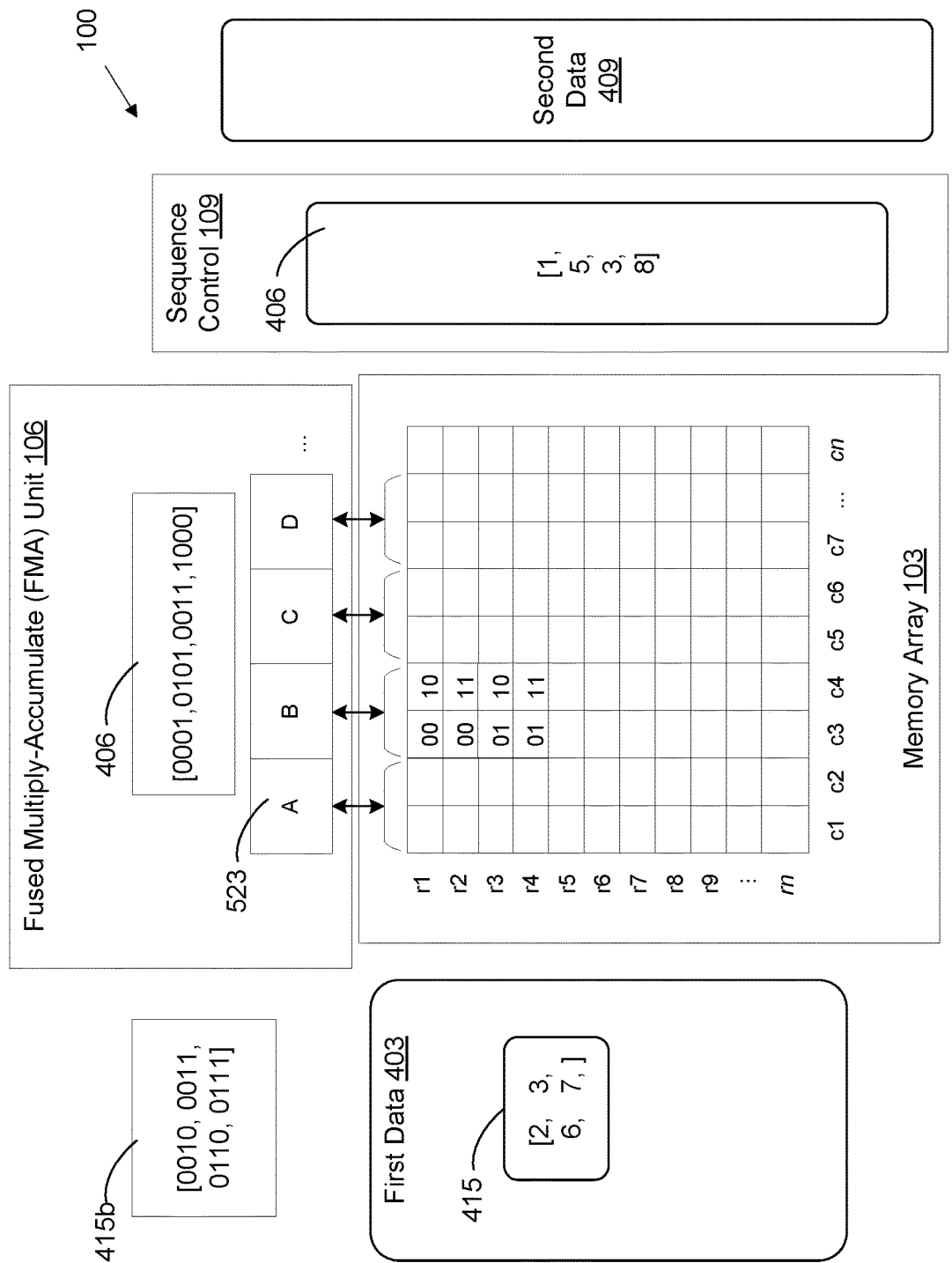
FIG. 5 is a drawing of an example of a bit-parallel allocation pattern for organizing data in a memory array of a PIM device.

FIG. 5 is a drawing of an example of a bit-parallel allocation pattern for organizing data in a memory array of a PIM device. When applying a bit-parallel allocation pattern, the sequence control 109 converts the first data 403 into a plurality of groups such as, for example, a first group 415. Each group is an array of elements of the first data 403. Each group may be formed to constitute sets of elements that together, represent the first data 403 as a first array of data. The bits of a number in a particular group are stored in parallel along a word line or row. For example, a first number of the first group 415, the number "2" in decimal, from the group that is composed of the array [2, 3, 6, 7], is stored along the first word line or row. For example, with two bits per memory cell and with 4-bit total width, the number "2" (represented as "0010" in a 4-bit binary format) may occupy two cells: the cell (r1, c3) with bits "00", and the cell (r1, c4) with bits "10". A second number of group 415, the number "3", from the group that is composed of the array [2, 3, 6, 7], is stored along the second word line or row. For example, with two bits per memory cell and with 4-bit total width, the number "3" may occupy two cells: the cell (r2, c3) with bits "00", and the cell (r2, c4) with bits 11. This continues for all numbers of the first group until the first group is stored in the memory array 103. Subsequent groups are stored in a similar manner, such that one or more groups may be stored in the third and fourth columns beginning on row 5 (following the first group 415) or stored along the fifth and sixth columns until the first data 403 is stored in the memory array 103. As a result, the first data 403 is stored in the memory as a first array of data comprising groups that are structured according to a bit-parallel allocation pattern.

Using this allocation pattern, the sequence control 109 is configured to apply the second array of data 406 to each of the plurality of groups. The sequence control 109 may control the calculations performed by an FMA unit 106 that is configured to include a plurality of sub-FMA units 523, where each sub-FMA unit 523 is dedicated to two columns. For example, a first sub-FMA unit 523 (unit A) may perform calculations for multiplicands supplied by columns c1 and c2, a second sub-FMA unit 523 (unit B) may perform calculations for multiplicands supplied by columns c3 and c4, a third sub-FMA unit 523 (unit C) may perform calculations for multiplicands supplied by columns c5 and c6, and so on.

The sequence control 109 may activate each word line or row of the memory array 103 in a sequence so that the whole numbers of one or more groups within the word line are provided as inputs into the FMA unit 106 along with the second array of data 406. For example, in a first iteration, the sequence control 109 may open or otherwise activate the first row or word line so that the first numbers of groups within the first row or word line, such as the first group 415 and first numbers of other groups stored on the first row, are provided as inputs into the FMA unit 106. The FMA unit 106 is controlled by the sequence control 109 to perform a plurality of concurrent dot product multiplications using sub-FMA units 523 configured to operate in parallel for a given iteration. The concurrent dot product multiplications include multiplying each of the first numbers, such as number "2" of the first group 415 (e.g., [2, 3, 6, 7]), and any first numbers of any additional groups along the selected word line with the first number of the second array of data 406 (e.g., [1, 5, 3, 8]), which is the number "1". For example, for a first iteration, the second sub-FMA unit 523 (unit B) performs a dot product multiplication using the multiplier "1" in decimal ("0001" in binary) and using the multiplicand "2" in decimal ("0010" in binary) as provided by cells (r1, c3) and (r1, c4).

For example, the sequence control 109 selects the appropriate memory cells of the memory array 103 using the allocation pattern to provide them as inputs into the FMA unit 106. The first dot product multiplication iteration includes selecting the multiplicands such as the first number of the first group 415 (e.g., [2, 3, 6, 7]), which is the number "2" along with first numbers of other groups stored along the first row and selecting the multiplier as the first number of second array of data 406 (e.g., [1, 3, 5, 8]) which is the number "1". The second dot product iteration includes selecting the multiplicands such as the second number of the first group 415 (e.g., [2, 3, 6, 7]) which is the number "3" and second numbers of other groups stored along the second row and selecting the multiplier as the second number of the second array of data 406 (e.g., [1, 5, 3, 8]) which is the number "5". After the second iteration, the process involves accumulating the dot product multiplication results with previous results. The parallel multiplication and accumulation may operate in a manner similar to the manner discussed in the example of FIG. 4, but where a data array element is stored across a plurality of columns in parallel.

Although decimal numbers are shown by way of example, various embodiments may use floating point numbers, numbers expressed with more multiple bits (e.g., more or less than 4-bit numbers, as shown in the example of the figures), or analog values of memory cells (e.g., analog voltages and currents) to produce relevant results (e.g., a floating point number generated from floating point calculations, an analog number based on current or voltage summations which can be converted to digital format or maintained in analog format and stored in respective memory cells).

Elements of the computed dot product array may constitute a feature map, which provides information on where (or in which part of) in the data object the feature was detected. The highest value in the feature map corresponds to highest probability of feature presence, and the lowest value in the feature map corresponds to lowest probability of feature presence. The feature map may be passed onto additional layers in a neural network or may be used in classification to identify a feature.

Figure 6:
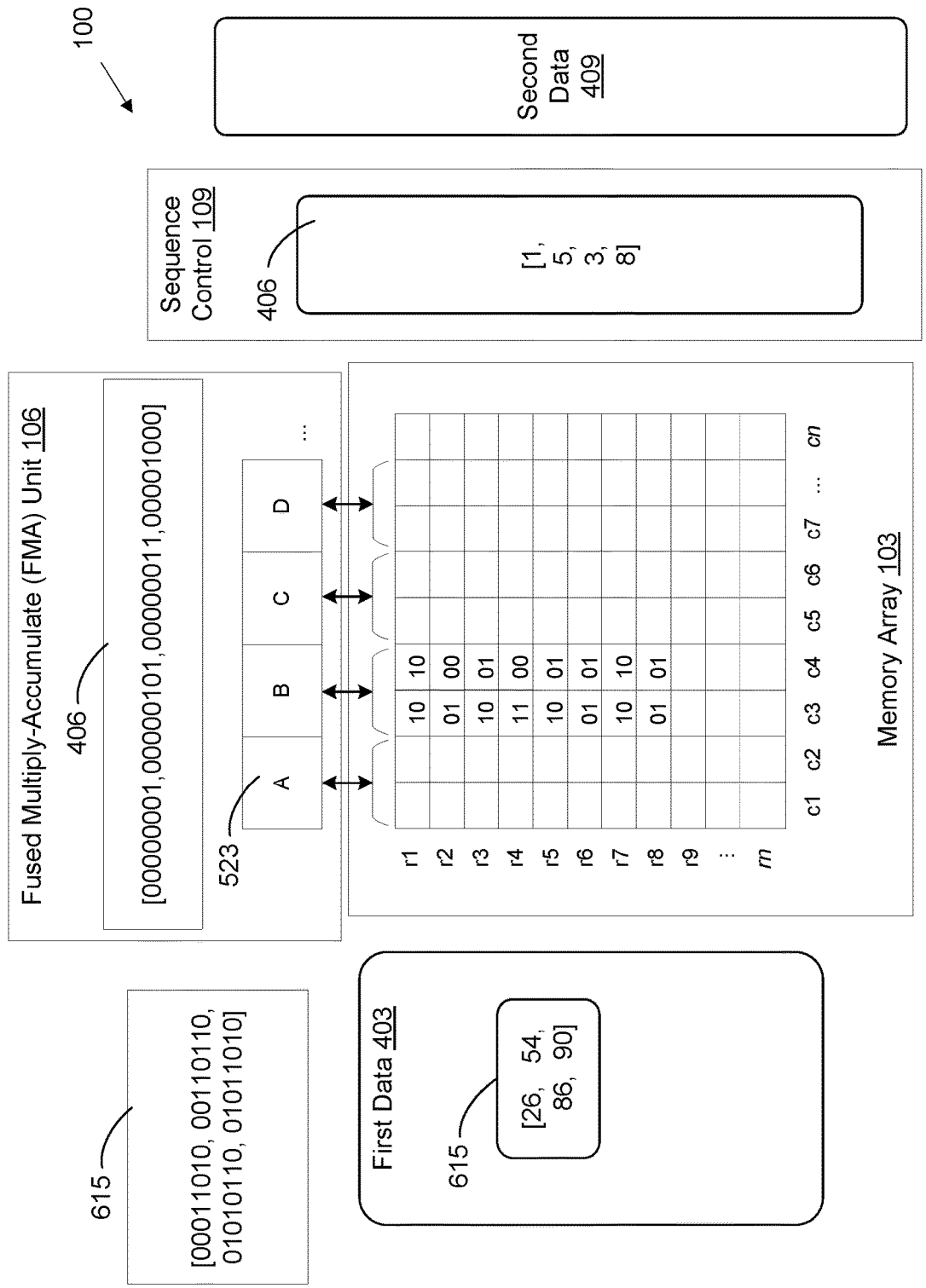
FIG. 6 is a drawing of an example of a serial-parallel allocation pattern for organizing data in a memory array of a PIM device.

FIG. 6 is a drawing of an example of a serial-parallel allocation pattern for organizing data in a memory array of a PIM device 100. When applying a serial-parallel allocation pattern, the sequence control 109 converts the first data 403 into a plurality of groups including a first group 615, where each group is an array of elements of the first data 403. The first group 615, may be composed of the array [26, 54, 86, 90] which is represented in 8-bit binary digits as [00011010, 00110110, 01010110, 01011010]. Each group is stored both in serial along a plurality of word lines and stored in parallel along a plurality of bit lines.

For example, the first number of the first group is the decimal number "26" ("00011010" in binary). This number is stored across multiple columns and multiple rows. It may be split up into four portions "00", "01", "10", and "10" which, together, form the decimal number "26". Along a first row, a first cell (r1, c3) and second cell (r1, c4) may store part of the number and along a second row, a third cell (r2, c3) and fourth cell (r2, c4) store the remainder of the number. The least significant digits of the binary number "00011010" are "10" and they may be stored in cell (r1, c3) while the most significant digits are "00" and are stored in cell (r2, c4). This pattern continues until all numbers of the first group is stored in the memory array 103. Subsequent groups are stored in a similar manner until the first data 403 is stored in the memory array 103. As a result, the first data 403 is stored in the memory as a first array of data comprising groups that are structured according to a serial-parallel allocation pattern.

Using this allocation pattern, the sequence control 109 is configured to apply the second array of data 406 to each of the plurality of groups. The sequence control 109 may control the calculations performed by an FMA unit 106 that is configured to include a plurality of sub-FMA units 523. In this example, each sub-FMA unit 523 is dedicated to two columns. For example, a first sub-FMA unit 523 (unit A) may perform calculations for multiplicands supplied by columns c1 and c2, a second sub-FMA unit 523 (unit B) may perform calculations for multiplicands supplied by columns c3 and c4, a third sub-FMA unit 523 (unit C) may perform calculations for multiplicands supplied by columns c5 and c6, and so on. Each element of the second array of data 406 is provided as a multiplier. In the example of FIG. 6, the second array of data is represented in 8-bit binary as the array [00000001, 00000101, 00000011, 00001000]. A first iteration uses as the multiplier the first number in the second data array 406 which is represented binary "00000001". A second iteration uses as the multiplier the second number in the second data array 406 is represented binary "00000101" and so on. This process continues until the second array of data 406 is applied to a group stored in the memory array 103.

The sequence control 109 may activate each word line or row of the memory array 103 in a sequence so that part of each numbers of one or more groups within the word line are provided as inputs into the FMA unit 106 along with the second array of data 406. For example, in a first iteration, the sequence control 109 may open or otherwise activate the rows r1 and r2 so that the first numbers of groups within word lines are provided as inputs into the FMA unit 106. The FMA unit 106 is controlled by the sequence control 109 to perform a plurality of concurrent dot product multiplications using sub-FMA units 523 configured to operate in parallel in a particular iteration. The concurrent dot product multiplications include multiplying portions of each of the first numbers, the decimal number "26" of the first group 615 (e.g., [26, 54, 86, 90]), and any first numbers of any additional groups along the selected word line with the portions of the first number of the second array of data 406 (e.g., [1, 5, 3, 8]), which is the number "1".

For example, for a first iteration, the second sub-FMA unit 523 (unit B) performs a dot product multiplication using the multiplier "00000001" in binary (which is the number "1" in decimal) and using the multiplicand "00011010" as provided by cells (r1, c3), (r1, c4), (r2, c3), and (r2, c4), where the multiplicand represents the decimal number "26". As part of the first iteration, the sequence control 109 may activate rows r1 and r2 as well as all or at least a portion of the columns.

In a second iteration, the second sub-FMA unit 523 (unit B) performs a dot product multiplication using the multiplier "00000101" in binary (which is the number 5 in binary) and using the multiplicand "00110110" as provided by cells (r3, c3), (r3, c4), (r5, c3), and (r5, c4), where the multiplicand represents the number "54" in decimal. The results of the two iterations are accumulated or otherwise summed. Thus, after four iterations, the dot product of multiple groups (including the first group 615) and the second array of data 406 is calculated.

In some embodiments, any iteration may include of two stages. The first stage may multiply the multiplier by the first parts of all respective multiplicands. For example, in case of the multiplicand "54" (in decimal) and the multiplier "5" (in decimal), the operation is represented as the following binary multiplication: '00000101'×'0110'='00011110', which is 30 (in decimal). The second stage may multiply the multiplier by the second parts of all respective multiplicands, then shift by a relevant number of bits and add to the second part. For example, in case of number "54" (in decimal) and the multiplier "5" (in decimal), the operation is represented as the following binary multiplication: '00000101'×'0011'='00001111', which is 15. After shifting by four bits, the result becomes '11110000'. Thereafter, this shifted value is added to the result computed in the first stage as follows: '11110000'+'00011110'=270 (in decimal). While this demonstrates one example, other embodiments are contemplated by the present disclosure.

The allocation patterns described herein may be distributed such that multiple parts of the groups may be stored in non-adjacent memory rows. Yet these storage patterns still may be aligned along relevant columns. Although the allocation patterns presented herein may be bit-serial, bit-parallel, or serial-parallel, other allocation patterns may be used as long as their map is known to the FMA unit 106 and sequence control 109. For example, a diagonal allocation patterns may be used. Dynamic allocation patterns may also be used. For example, data allocation in a memory array 103 may be in bit-parallel configuration while the results may be stored in bit-serial configuration, etc.

Although decimal numbers are shown by way of example, various embodiments may use floating point numbers, numbers expressed with more multiple bits (e.g., more or less than 4-bit numbers, as shown in the example of the figures), or analog values of memory cells (e.g., analog voltages and currents) to produce relevant results (e.g., a floating point number generated from floating point calculations, an analog number based on current or voltage summations which can be converted to digital format or maintained in analog format and stored in respective memory cells).

Elements of the computed dot product array may constitute a feature map, which provides information on where (or in which part of) in the data object the feature was detected. The highest value in the feature map corresponds to highest probability of feature presence, and the lowest value in the feature map corresponds to lowest probability of feature presence. The feature map may be passed onto additional layers in a neural network or may be used in classification to identify a feature.

Figure 7:
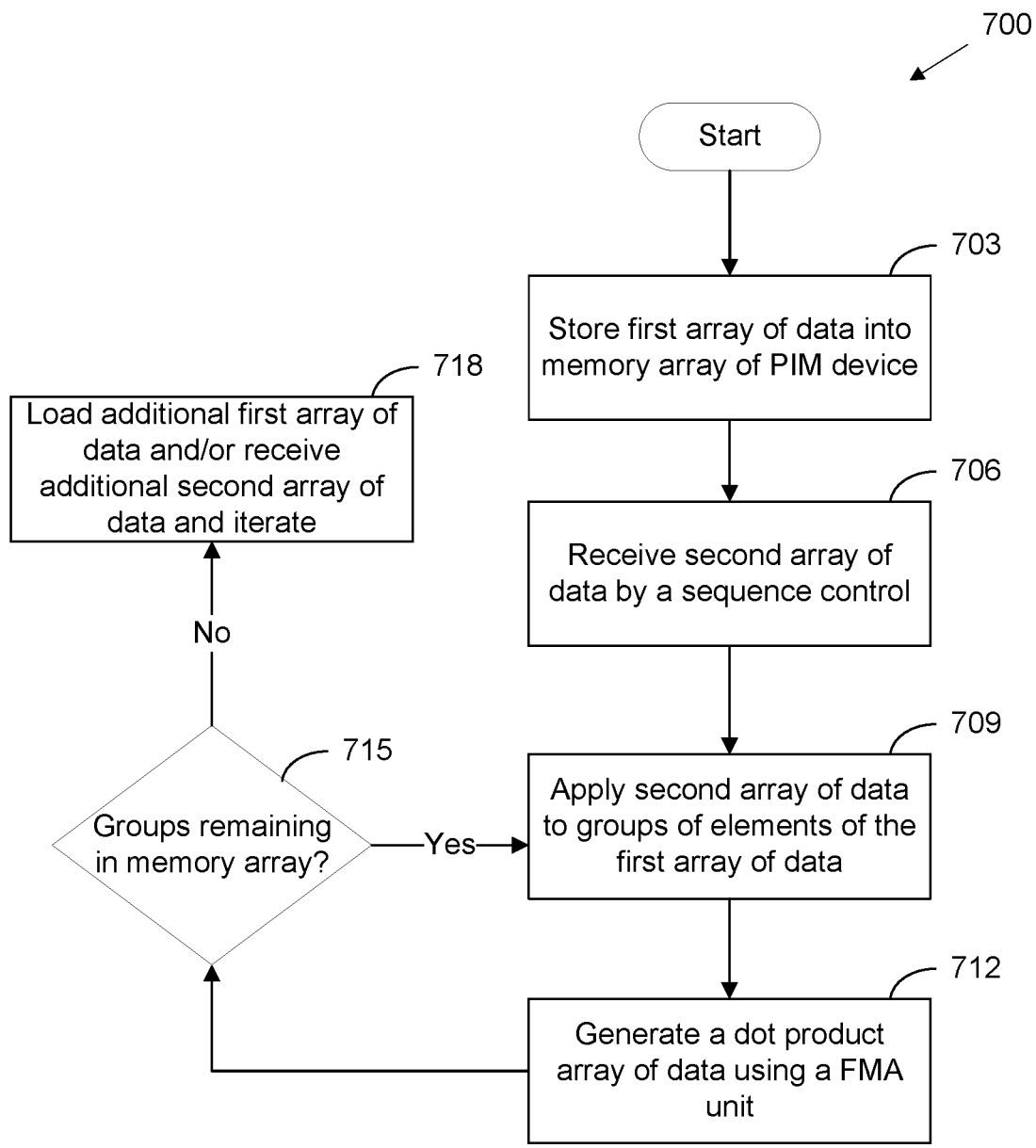
FIG. 7 is a flowchart illustrating varying examples of the functionality of a PIM device according to various embodiments.

FIG. 7 is a flowchart illustrating varying examples of the functionality of a PIM device 100 according to various embodiments. The boxes in the flowchart may represent microcode, machine code, firmware, or other software executable by a PIM processor of a PIM device 100. The boxes of the flowchart may alternatively represent steps in a method 700. The method may be performed by a PIM device 100.

At 703, the PIM device 100 stores a first array of data into a memory array 103. The first array of data may be data subject to feature identification. This may be a data object such as, for example, an image data object or other content that contains information needing classification or analysis. The first array of data may alternatively be comprised of elements of at least one filter such as, for example, a convolutional filter. A filter may be a filter used in neural network to identify features in a data object.

A sequence control 109 may identify elements of the first array of data and store them into corresponding cells of the memory array 103 so that each array element maps to a corresponding memory cell of the memory array 103. In addition, the sequence control 109 may organize the data stored in the memory array according to a plurality of groups using an allocation pattern. The allocation pattern may be bit-serial, bit-parallel, or serial-parallel or other.

At 706, the PIM device 100 receives a second array of data. The second array of data may be data subject to feature identification. This may be a data object such as, for example, an image data object or other content that contains information needing classification or analysis. The second array of data may alternatively be elements of at least one filter such as, for example, a convolutional filter. A filter may be a filter used in neural network to identify features in a data object.

A sequence control 106 may derive the second array of data from one or more arrays such that the second array of data comprises elements selected from a plurality of different arrays.

At 709, the PIM device 100 applies the second array of data to groups of elements of the first array of data according to the allocation pattern. For example, a sequence control may use an allocation pattern to select different groups of elements of the first array of data. Using an allocation pattern, the second array of data and the groups of elements of the first array of data are then inputted into an FMA unit 106 through a series of iterations. In some embodiments, the sequence control activates one or more word lines and one or more bit lines to allow the FMA unit 106 to receive multiple groups as multiplicand inputs for performing concurrent dot product calculations.

At 712 the PIM device 100 generates a dot product array of data using an FMA unit 106. The dot product array of data may be part of a feature map. It may be retrieved using a system link 115 as part of implementing a layer in a convolutional neural network.

At 715, if there are groups remaining in the memory array 103, then the sequence controller selects the next row and/or column of the memory array 103 to identify a subsequent set of groups of elements of the first array of data. The PIM Device 100 continues to apply the second array of data to subsequent groups of elements of the first array of data until no groups remain or until a certain point as programmed in the microcode of the sequencer or commanded to it via system link 115.

At 718, upon completing operations on data contained by a memory array 103, the PIM device 100 loads additional first array of data and/or receive additional second array of data. In this respect either the memory array 103 is updated with new data or the sequence control 109 applies different data to the memory array 103 or both. The process iterates by generating additional dot product array data.

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor in a computing system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

Figure 8:
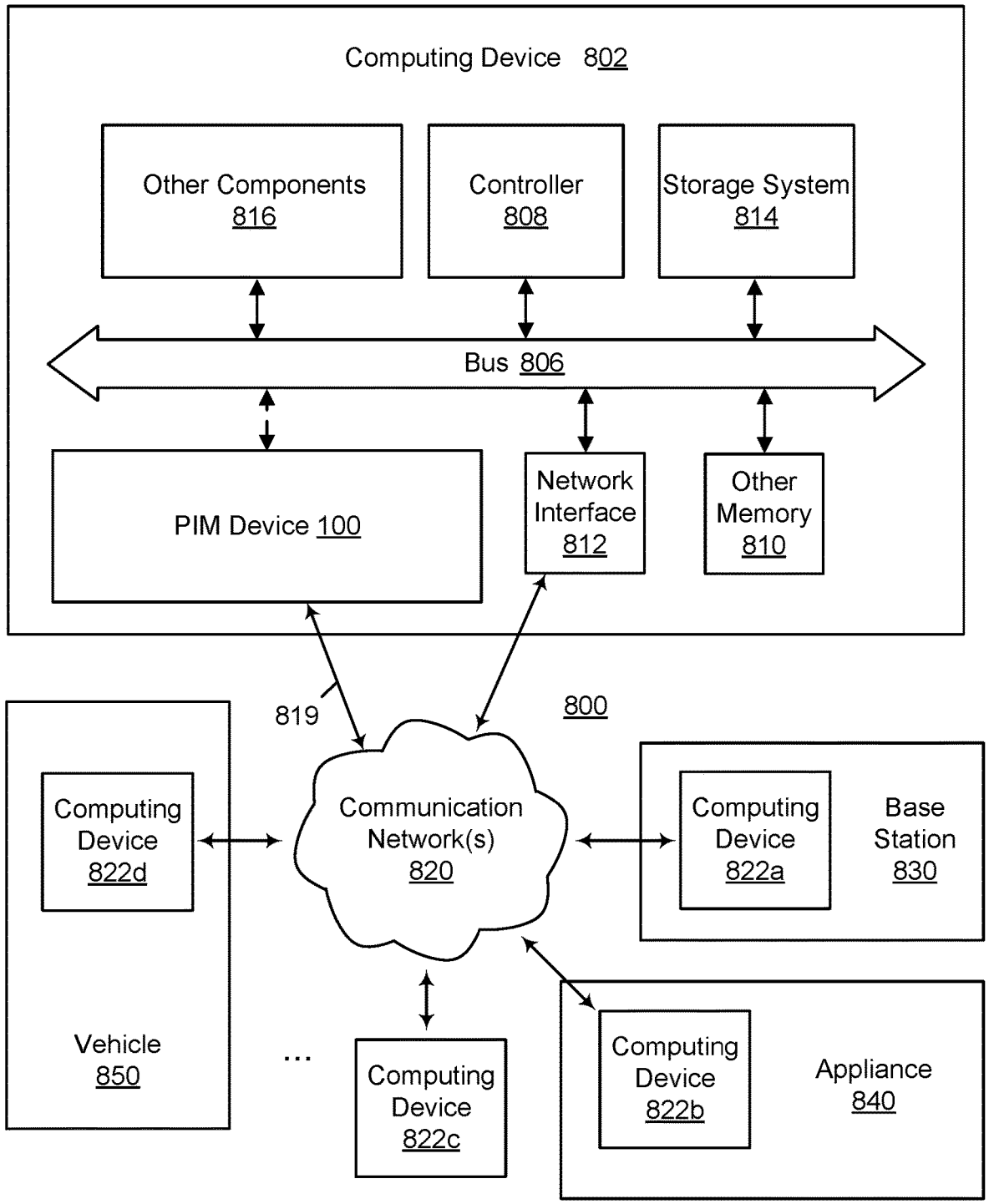
FIG. 8 illustrates an example networked system that includes a PIM device, in accordance with some embodiments of the present disclosure.

FIG. 8 illustrates an example networked system 800 that includes a PIM device 100, in accordance with some embodiments of the present disclosure. FIG. 8 illustrates example parts of an example of a computing device 802 with is part of the networked system 800. FIG. 8 shows how such computing devices can be integrated into various machines, apparatuses, and systems, such as IoT (Internet of Things) devices, mobile devices, communication network devices and apparatuses (e.g., see base station 830), appliances (e.g., see appliance 840), and vehicles (e.g., see vehicle 850).

The computing device 802 and other computing devices of the networked system 800 (e.g., see computing devices 822a, 822b, 822c, and 822d) can be communicatively coupled to one or more communication networks 820. The computing device 802 includes, for example, a bus 806, a controller 808 (e.g., a CPU), other memory 810, a network interface 812, a storage system 814, other components 816 (e.g., any type of components found in mobile or computing devices, GPS components, Input/Output (I/O) components such various types of user interface components, sensors, a camera, etc.), and a PIM device 100. The other components 816 may also include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 806 communicatively couples the controller 808, the other memory 810, the network interface 812, the data storage system 814 and the other components 816, and can couple such components to the PIM device 100 in some embodiments. For example, a system link 115 of the PIM device 100 may couple to the bus 806.

The computing device 802 includes a computer system that includes at least controller 808, other memory 810 (e.g., random access memory (RAM), read-only memory (ROM), flash memory, dynamic random-access memory (DRAM) such as synchronous DRAM (SDRAM) or Rambus DRAM (RDRAM), static random-access memory (SRAM), crosspoint or cross-bar memory, crossbar memory, etc.), the PIM device 100, and data storage system 814, which may communicate with each other via bus 806 (which can include multiple buses). In some embodiments, the PIM device 100 may not communicate over bus 806.

To put it another way, FIG. 8 includes a block diagram of computing device 802 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 812) to other machines in a Local Area Network (LAN), an intranet, an extranet, and/or the Internet (e.g., see network(s) 820). The machine can operate in the capacity of a server or a client machine in client-server network environment, as a peer machine in a peer-to-peer (or distributed) network environment, or as a server or a client machine in a cloud computing infrastructure or environment.

Controller 808 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 808 can also be one or more special-purpose processing devices such as an ASIC, a programmable logic such as an FPGA, a digital signal processor (DSP), network processor, or the like. Controller 808 is configured to execute instructions for performing the operations and steps discussed herein. Controller 808 can further include a network interface device such as network interface 812 to communicate over one or more communication networks (such as network(s) 820).

The data storage system 814 can include a machine-readable storage medium (also known as a computer-readable medium) on which is stored one or more sets of instructions or software embodying any one or more of the methodologies or functions described herein. The data storage system 814 can have execution capabilities such as it can at least partly execute instructions residing in the data storage system. The instructions can also reside, completely or at least partially, within at least one of the other memory 810 and the PIM device 100 and/or within the controller 808 during execution thereof by the computer system, at least one of the other memory 810 and the PIM device 100 as well as the controller 808 also constituting machine-readable storage media. The other memory 810 can be or include main memory or system memory of the computing device 802. The other memory 810 and the PIM device 100 can have execution capabilities such as it can at least partly execute instructions residing in any memory of the computing device 802.

As mentioned, the networked system 800 includes computing devices, and each of the computing devices can include one or more buses, a controller, a memory, a network interface, a storage system, and other components. Also, each of the computing devices shown in FIG. 8 and described herein can include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to network(s) 820 that includes at least a local to device network such as Bluetooth or the like, a wide area network (WAN), a local area network (LAN), an intranet, a mobile wireless network such as 4G or 5G, an extranet, the Internet, and/or any combination thereof. In some embodiments, as shown with the connection 819, the PIM device 100 can include at least one network interface so that it can communicate separately with other devices via communication network(s) 820. For example, the system link 115 may couple to the communication network 820. In this respect, a memory module or a memory module system of the PIM device 100 may have its own network interface so that such a component can communicate separately with other devices via communication network(s) 820.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing device 802 shown in FIG. 8, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In some embodiments, a PIM device 100 may include multiple memory arrays 103. Each memory array may be configured to implement different stage of convolutional neural network. For example, the dot product array data generated from data in a first memory array 103 may be processed and stored in a second memory array 103 of the PIM device 103.

In some embodiments, the PIM device 100 may further comprise a PIM processor configured to perform in-memory video codec. The in-memory codec may be used in conjunction with a neural network layer implemented using a memory array 103, FMA unit 109, and sequence control 109.

In some embodiments, the PIM device 100 may further comprise a PIM processor configured to perform pooling operations or perform Rectified Non-Linear unit (ReLU) functions in-memory. The pooling and/or ReLU functions may be performed on data concurrently on the dot product array data while it is generated.

In some embodiments, the PIM device 100 may be coupled to external systems via the system link 115 to implement a distributed convolutional neural network. For example, the PIM device 100 may communicate with a graphics processor unit (GPU), a Digital Signal Processor (DSP) or other processors.

In some embodiments, the PIM device 100 may be coupled to external systems via the system link 115 to implement a distributed convolutional neural network. For example, the PIM device 100 may communicate with a graphics processor unit (GPU), a Digital Signal Processor (DSP) or other processors.

In some embodiments, the data provided to the PIM device 100 includes a predication mask to parallelize serial operations in the PIM device 100.

In some embodiments, PIM device 100 is configured to perform 3-dimensional convolution. For example, a data object array may be inputted into an FMA unit 106 with varying filter channels as inputs.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
a memory array of a Processing In Memory (PIM) device configured to store a first array of data in a plurality of groups within the memory array according to a predefined allocation pattern, the memory array comprising a plurality of memory cells, a plurality of columns and a plurality of rows, wherein the first array of data is generated from a set of arrays of image data, each array in the set of arrays corresponding to a channel of the image data;
a sequence control of the PIM device configured to receive a set of convolutional filters, each convolutional filter in the set of convolutional filters data comprising a matrix of numerical values, and generate a filter array from the set of convolutional filters, the filter array comprising a one-dimensional array generated from matrices of the set of convolutional filters; and
a fused multiply-accumulate (FMA) unit of the PIM device configured to generate a dot product array of data by applying the filter array to each of the plurality of groups, wherein the dot product array of data comprises results of convolutional operations performed using each of the set of convolutional filters on a corresponding channel of the image data;
wherein each group of the plurality of groups comprises elements stored at memory cells corresponding to positions in rows and columns of the memory array.

2. The system of claim 1, wherein the first array of data comprises data subject to feature identification.

3. The system of claim 1, the set of convolutional filters are part of a neural network, and wherein the dot product array of data is a part of a feature map.

4. The system of claim 1, wherein the allocation pattern applied to the first array of data is a bit-serial allocation pattern, wherein each group is structured along the columns of the memory array.

5. The system of claim 1, wherein the memory array is configured to store at least one additional array of data in a plurality of groups within the memory allay; and wherein the FMA unit is configured to generate a second dot product array of data by applying at least one of the filter array or a third array to the plurality of groups ofthe at least one additional array.

6. A method comprising:
receiving a data object in a predefined format;
storing the data object into a memory array of a Processing In Memory (PIM) device by arranging the data object into a data object array comprising a plurality of groups within the memory array according to a predefined allocation pattern, the memory array comprising a plurality of memory cells, a plurality of columns and a plurality of rows, wherein the data object is generated from a set of arrays of image data, each array in the set of arrays corresponding to a channel of the image data;
receiving a set of convolutional filters, each convolutional filter in the set of convolutional filters data comprising a matrix of numerical values;
generating a filter array from the set of convolutional filters, the filter array comprising a one-dimensional array generated from matrices of the set of convolutional filters
generating a dot product array of data using a fused multiply-accumulate (FMA) unit of the PIM device by applying the filter data array to each of the plurality of groups, wherein the dot product array of data comprises results of convolutional operations performed using each of the set of convolutional filters on a corresponding channel of the image data; and
wherein each group of the plurality of groups comprises elements stored at memory cells corresponding to positions in rows and columns of the memory array.

7. The method of claim 6, wherein the data object comprises data subject to feature identification.

8. The method of claim 6, wherein the set of convolutional filters are part of a neural network, and wherein the dot product array of data is a part of a feature map.

9. The method of claim 6, wherein the allocation pattern applied to the data object array is a bit-serial allocation pattern, wherein each group is structured along the columns of the memory array.

10. The method of claim 6, wherein the memory array is configured to store an additional data object array comprising a plurality of groups within the memory array and receive at least one additional filter data; and wherein the FMA unit is configured to generate a second dot product array of data by applying the filter array or at least one additional filter data to the plurality of groups of the additional data object array.

11. A method comprising:
receiving a set of convolutional filters, each convolutional filter in the set of convolutional filters comprising a matrix of numerical values;

storing the set of convolutional filters into a memory array of a Processing In Memory (PIM) device by arranging the convolutional filter data into a set of filter arrays comprising a plurality of groups within the memory array according to a predefined allocation pattern, the memory array comprising a plurality of memory cells, a plurality of columns and a plurality of rows;

receiving a data object, from a sequence control of the PIM device, wherein the data object comprises a set of arrays of image data, each array in the set of arrays corresponding to a channel of the image data;

generate a data object array from the data object, the data object array comprising a one-dimensional array generated from the set of arrays of image data; and generating a dot product array of data using a fused multiply-accumulate (FMA) unit of the PIM device by applying the data object array to the plurality of groups, wherein the dot product array of data comprises results of convolutional operations performed using each of the set of convolutional filters on a corresponding channel of the image data;

wherein each group of the plurality of groups comprises elements stored at memory cells corresponding to positions in rows and columns of the memory array.

12. The method of claim 11, wherein the data object comprises data subject to feature identification.

13. The method of claim 11, wherein the allocation pattern applied to the set of filter arrays is either a bit-serial allocation pattern or bit-parallel allocation pattern, wherein each group is structured along the columns of the memory array for bit-serial pattern, wherein each group is structured along the rows of the memory array for bit-parallel pattern.

14. The method of claim 11, wherein the set of convolutional filters are part of a neural network, and comprising the dot product array of data is a part of a feature map.

15. The method of claim 11, wherein the memory array is configured to store an additional set of filter arrays comprising a plurality of groups within the memory array and receive at least one additional data object; and wherein the FMA unit is configured to generate a second dot product array of data by applying the data object or the additional data object to the plurality of groups of the set of filter arrays or to the plurality of groups of the additional set of filter arrays.

* * * * *